United States Patent

[11] 3,582,758

| | | |
|---|---|---|
| [72] | Inventor | John B. Gunn<br>Mt. Kisco, N.Y. |
| [21] | Appl. No. | 862,213 |
| [22] | Filed | Sept. 30, 1969 |
| [45] | Patented | June 1, 1971 |
| [73] | Assignee | International Business Machines Corporation<br>Armonk, N.Y. |

[54] RECTIFIER USING LOW SATURATION VOLTAGE TRANSISTORS
4 Claims, 3 Drawing Figs.

[52] U.S. Cl. .................................................... 321/47, 307/253
[51] Int. Cl. ...................................................... H02m 7/12
[50] Field of Search ......................................... 321/8, 11, 47; 307/253

[56] References Cited
UNITED STATES PATENTS

| 2,953,738 | 9/1960 | Bright ........................... | 321/47 |
| 3,083,328 | 3/1963 | Mallery et al. ................ | 321/47X |
| 3,143,668 | 8/1964 | Bloodworth et al. ......... | 307/253X |

OTHER REFERENCES

RCA Technical Notes, " High Efficienty Low Voltage Rectifier," RCA TN No. 627, Aug. 1965 (Copy in 321/8)

Primary Examiner—William M. Shoop, Jr.
Attorneys—Hanifin and Jancin and George Baron ABSTRACT: A circuit is employed utilizing the low collector-emitter voltage of a saturated transistor to obtain more efficient rectification of an alternating current supply than is achieved by a diode. A regenerative feedback circuit to the base of the transistor is provided so that once collector-to-emitter current is initiated, current is fed back to the base of the transistor to further drive the transistor into its conducting condition. However, since transistors may operate in a reverse direction when the load voltage is greater than that of the power supply, such regenerative feedback circuit is employed in series with the saturated transistor whereby any reverse collector current due to inverted operation causes the base of such transistor to be cut off, preventing any undesired reverse transistor operation.

PATENTED JUN 1 1971

3,582,758

INVENTOR
JOHN B. GUNN

BY
ATTORNEY 3,582,758

RECTIFIER USING LOW SATURATION VOLTAGE TRANSISTORS

BACKGROUND OF THE INVENTION

Many low voltage power supplies contain diodes for rectifying AC into DC; for example, a power supply driving a 1-volt DC load from an AC source might be suffering another 1-volt drop across the diodes employed as the rectifying elements of that power supply. In effect, as much as one-half the power that should go to the load might be dissipated within the power supply itself. Such dissipation is wasteful of electrical power and entails auxiliary power for driving cooling apparatus to maintain the power supply at a constant temperature for its proper operation. Obviously such loss of power and its attendant heat dissipation problems can be prohibitively expensive.

It is well known that a bipolar transistor, driven into saturation by a current applied to its base, can carry a current between emitter and collector with less voltage drop than that across a rectifying diode. To use such a transistor to convert AC to DC, it has been necessary in the past to operate it as a synchronous rectifier. In this mode an intermittent base current, controlled in phase with respect to the AC supply voltage, is generated by a suitable circuit, so as to turn on the transistor during those periods of time in which current is to be passed, and turn it off when current is to be blocked. A common way to do this is by means of an additional winding, or tapping, on the transformer by which the transistor is connected to the AC power line. This approach provides half-cycle pulses of base current and leads to efficient rectification, but is unsatisfactory when conditions are such that the voltage across the load can, during part of the "on" half-cycle, exceed that of the AC supply. This is the case if the load includes a shunt battery or capacitor, or when several transistors are connected between a polyphase source and any type of load. Such conditions are very commonly encountered when the DC is to be used to supply electronic equipment, as some such technique must be used to reduce the ripple voltage to a low value. The trouble arises from the fact that any bipolar transistor is capable of operating in an inverted mode, with the role of emitter and collector junctions interchanged. Thus, if base current is still flowing when the voltage across the transistor emitter and collector reverses, a large reverse current will flow, due to inverted operation, power will be wasted, and inefficient operation will result. This difficulty could be overcome in principle by using additional, more complex, circuits to derive, from the AC input voltage, pulses of base current of the correct duration (less than one half-cycle) to match the required conduction period of the transistor switch. Even this approach becomes impossible when the load current varies, as the required base current pulses then vary in duration and phase.

These difficulties are overcome, and other advantages obtained, in the present invention by relating the base drive current of each transistor to its collector current, for example by means of a current transformer with its primary in the collector circuit and its secondary in the base circuit. Base current pulses of precisely correct duration and phase to match any load condition are obtained by regeneration around the circuit including the transistor and transformer when the voltage across the former is in the direction in which conduction is desired. Inverted operation is prevented because any reverse collector current turns the base drive off. In addition, the circuit consisting of transformer, transistor, and an optional protective diode is connected to the AC source and load by only two terminals, thus simulating an ordinary two terminal diode with very low forward drop, and simplifying the design of the system compared with methods using separate base drive.

Thus, it is an object of this invention to employ transistors instead of diodes as rectifying elements in a power supply, employing regenerative transformer action in the transistor circuitry to both improve its I-V characteristics and to prevent inverted operation of said transistors.

The foregoing and other objects, features and advantages of the invention will be apparent from the following more particular description of the preferred embodiments of the invention, as illustrated in the accompanying drawings.

BRIEF DESCRIPTIONS OF THE DRAWINGS

Figure 1:
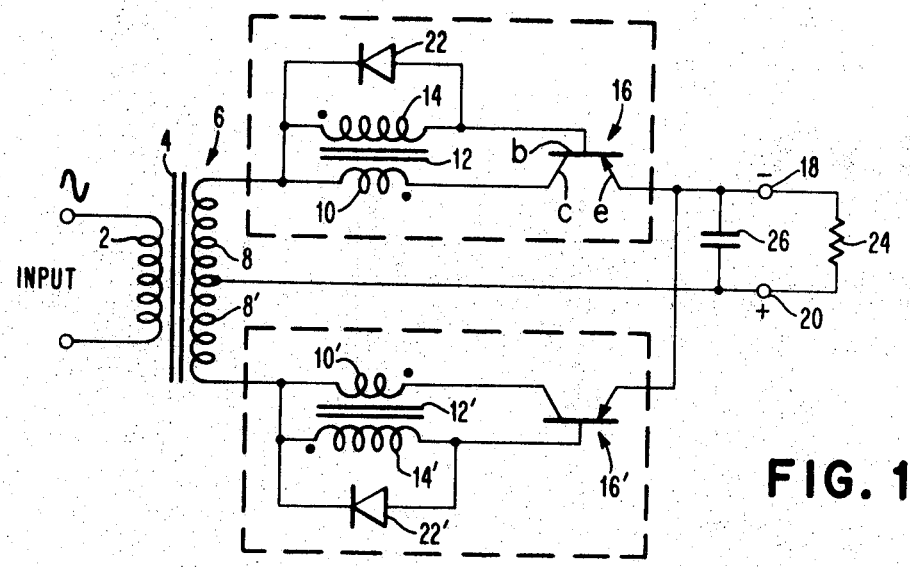
FIG. 1 is an embodiment of the novel transistor circuit employed in a DC power supply.

As seen in FIG. 1, a full-wave rectified circuit for carrying out the above-mentioned objects comprises a primary winding 2 of a transformer 4 on which is wound a center-tapped secondary winding 6. One portion 8 of the center-tapped secondary winding 6 is in series with a primary winding 10 of transformer 12, whose secondary winding 14 is coupled to said primary winding 10 and serially connected thereto, the ratio of secondary to primary turns being $n:1$. Solely for the purpose of illustrating the invention, the transistor 16 is a PNP type whole base $b$ is connected to secondary winding 14 and its collector $c$ is connected to the primary winding 10 of transformer 12. The emitter-to-collector current of transistor 16 flows through a load 24 connected across output terminals 18 and 20. Since the circuit of FIG. 1 is symmetrical, elements 8', 10', 14', and 16' perform similar functions to those of the corresponding unprimed elements. Capacitor 26 is a standard smoothing capacitor used in reducing voltage ripple at the output terminals of the rectifier circuit.

In the configuration of FIG. 1, each transistor 16 (or 16') derives its base current from its collector current by means of transformer 12 (or 12'). If the base current were derived from a tapping on transformer 4, as in the prior art, the low collector-emitter voltage of transistor 16 in its saturated state could be employed for its diode characteristic, producing rectification of the AC input with low power loss in the transistor. But where the load of the transistorized power supply is either capacitive or a battery, the load voltage may be greater than the instantaneous value of the voltage applied to the collector of the transistor, due to the charge stored in the load, during the period that the base $b$ of transistor 16 is still turned on. Under such conditions, the transistor would operate in an inverted mode, permitting reverse current flow during that part of the charging half-cycle of the power supply when the collector voltage is less than the load voltage. Since such reverse current occurs while there is a substantial voltage drop across the transistor, the resulting power loss would nullify the advantage of low forward direction voltage drop of a saturated transistor.

In the circuit of FIG. 1, rectification is obtained in the following way. Assume that the voltage across the secondary winding 8 of the transformer 4 is less than the voltage across load 24, and no current is flowing in base $b$ of transistor 16. Then the current through emitter $e$ of transistor 16 will be just the very small saturation current of the reverse-biased base-emitter junction. If now the transformer voltage rises above the load voltage, the base-emitter junction of transistor 16 will become forward biased, and when this forward bias exceeds about 0.5 volts for a germanium transistor, a small emitter current will start to flow through load 24. The resulting collector current, flowing into the dotted end of winding 10, causes a current of $1/n$ the magnitude to flow out of base $b$ of 16 into the undotted end of winding 14 (diode 22 is meanwhile reverse-biased, and carries no current). This base current has the effect of turning on more collector current, and so a regenerative process is set up, provided the current gain $\beta$ of transistor 16 is greater than $n$. This regenerative process ends when the voltage $V_{ce}$ between $e$ and $c$ of transistor 16 has dropped to a low value, typically 30 mv., at which time $\beta$ is equal to $n$. Further increase in the voltage across 8 results in an increase in current through the transistor, but only a slight increase in $V_{ce}$, as long as the transistor remains saturated—that is, as long as at the higher current, there is a low voltage $V_{ce}$ at which $\beta=n$. During the time while the load current (and hence collector current) is varying, the base current is also varying to remain $1/n$ of the collector current. Thus saturation can be maintained at high load current levels without wastefully high base currents at low load currents.

When the load current falls, towards the end of the conduction period, the base current also falls, but reaches zero a little earlier than the load current would if $V_{ce}$ were maintained small. This results from the leakage of flux into the core of the transformer 12, due to the finite voltage (of order 0.8 v) across the secondary winding 14 during the time that base current is flowing. This early turnoff causes a momentary rise in $V_{ce}$, but the effects can be kept small by using an adequate value of secondary inductance in transformer 12. This leakage of flux into the core of transformer 12 also causes an inductive spike of voltage to appear across secondary winding 14 during turnoff. If this spike is large enough to endanger the transistor it can be suppressed by adding diode 22 in the polarity shown.

The arrangement of the transformer 12 and its regeneratively coupled windings 10 and 14 respectively to the base $b$ and collector $c$ of transistor 16 prevents any reverse current flow regardless of the nature of the load. As soon as a reverse collector-to-emitter current flow is initiated through transistor 16, the increased current flow into the undotted end of winding 10 causes an increase flow of current out of the undotted end of winding 14 into the base of transistor 16. Since the transistor 16 was chosen as a PNP type, such increased current flow into base $b$ turns the transistor off. The regenerative coupling is effective to more quickly turn off the transistor. Obviously, where NPN-type transistors are used instead of PNP-type the regenerative coupling is such that any reverse current flow through the transistor will cause the associated NPN transistor base to go more negative so as to turn it off.

During conduction, the total voltage drop across the circuit contained in the dotted lines in FIG. 1 (which is to be compared with the forward drop of a normal diode) is greater than the value of $V_{ce}$ of 16, because it includes the voltage $V_p$ across primary winding 10 of transformer 12. This voltage is equal to $1/(n-1)$ times the collector-base voltage of transistor 16 in its saturated condition, plus an amount due to the copper losses in the primary and secondary windings of 12. The voltage $V_p$ may be comparable with the saturated value of $V_{ce}$, and the turns ratio $n$ is chosen to minimize the sum of $V_{ce}$ and $V_p$. Usually, a broad minimum in this total voltage exists for values of $n$ in the neighborhood of 15. The design of the transformer 12 is further determined by the requirements that it must have enough secondary inductance to limit the "early turnoff" effect mentioned above, enough secondary flux-turns to support the secondary voltage existing during the conduction period, and a core with low enough remanent induction to prevent its remaining in a saturated state from one cycle to the next. This last requirement is more easily met by using a core with an airgap, in the conventional way. A typical design to operate at 60 Hz. would use a toroidal core of 3 percent silicon iron, of dimensions 0.5 inch ID, 1.5 inch OD, 0.5 inch wide, with a double airgap of about 0.0002 inch, wound with two primary turns and 30 secondary turns ($n=15$).

It will be understood that the transformer 12 in FIG. 1 can be connected to transistor 16 in other, functionally equivalent ways. For example, the connection between windings 10 and 14 might be moved to the other end of 10, or 10 might be connected in series between the emitter $e$ and load 24, with 14 between base $b$ and collector $c$ of 16, and a direct connection between $c$ and winding 8 of transformer 4.

In essence, what is desired is that the direction of the base current through transistor 16 be determined by the direction of the collector or emitter current so as to achieve the low voltage drop possible, by using a saturated transistor switch as a rectifier without risking the undesirable consequences of inverted operation. In the instant case, a transformer was employed to apply a control signal to the base of the transistor so as to achieve the latter. However, the invention need not be limited to such preferred transformer means.

Figure 3:
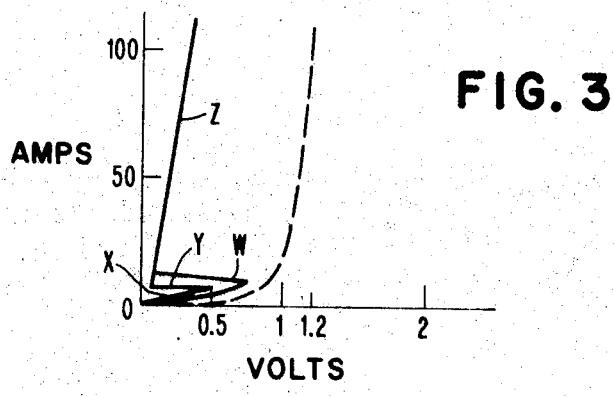
FIG. 3 is a comparison of the current-voltage characteristics of applicant's "transistorized diode" with a conventional low impedance diode employed in power supplies.

For conventional diodes, such as silicon or germanium PN junction, the rectifying characteristics can be described by a current-voltage (I-V) curve. The voltage to the knee of the I-V plot (as seen in FIG. 3) is approximately 0.5 volt to 1 volt for such diodes. For a current of 100 amperes, there is a typical voltage drop of approximately 1.2 volts, resulting in a peak power loss of approximately 120 watts. For the transistor circuit of the present invention a similar I-V current can be drawn for the circuit within the dotted lines in FIG. 1. Where a germanium PNP alloy power transistor, type 2N2728, was used, together with a transformer as described above, the bottom portion X of the I-V plot shows that a minimum voltage of approximately 0.5 volts is needed to trigger an emitter-to-base current for the transistor 16. Once emitter-to-base current has begun to flow, collector-to-emitter current is turned on. The initiation of collector-to-emitter current causes, via windings 10 and 14, regenerative base current to flow, and such increased base current further causes increased emitter-to-collector current to flow, resulting, as is shown by portion Y of the curve in FIG. 3, in a lowering of the voltage drop across the transistor. Portion Z of the curve indicates that the transistor 16 is operating in a saturated state and for increasing current through the transistor there is negligible voltage change. Thus, for a 100-ampere flow through the regeneratively actuated rectifier, there is only a drop of 0.2 volts, resulting in a power loss of only 20 watts as compared with 100 watts in a conventional diode rectifying circuit. On turning off the current there is again a rise in voltage to a slightly higher value than during turn-on, as shown by $w$ in FIG. 3. Neither the turn-on nor turnoff transients cause appreciable energy dissipation, as they occur at times when the current is low and last only a very short time.

Figure 2:
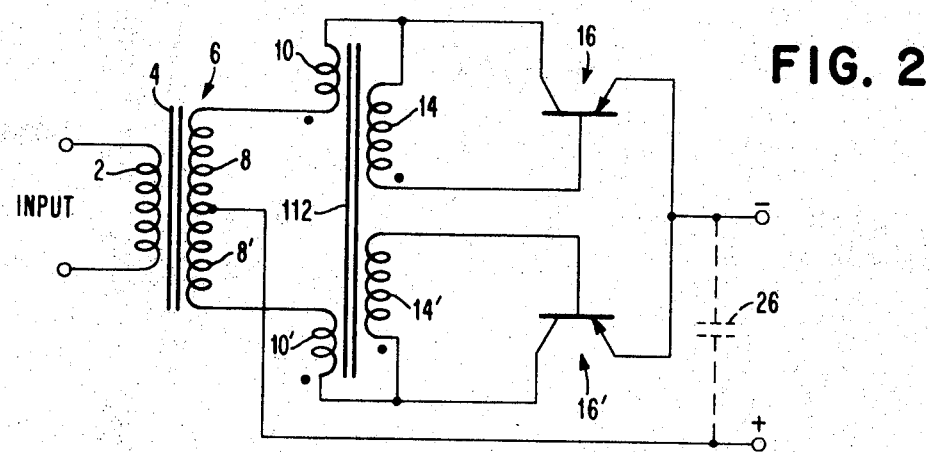
FIG. 2 is a modification of the embodiment of FIG. 1 employing a single transformer core instead of the two transformer cores in the DC power supply of FIG. 1.

In FIG. 2, a full-wave rectifier is shown using the regenerative circuit of FIG. 1 but only a single transformer 112 is employed to serve both transistors rather than two separate transformers 12 and 12'. The regenerative coupling between windings 10 and 14 and 10' and 14' is maintained but all such windings are located on a single transformer core.

Although a full-wave rectifier has been employed as the circuitry for illustrating the invention, it is understood that the invention is not so limited. The heart of the invention is shown enclosed in the dotted boxes of FIG. 1 and consists of a regeneratively actuated transistor that serves as a low impedance diode and is meant to replace conventional diodes that must conduct current for a limited time. As current changes with time through the transistor 16, the coupling between windings 10 and 14 diminishes the impedance of the device as saturation is reached, as is seen by comparing the I-V characteristics of the instant device and that of a conventional diode in FIG. 3.

In effect, the present device acts as a "superdiode" resulting in less power loss than conventional diodes. If current changes with time through the transistor are relatively slow, then a larger transformer 12 would have to be used; but such modifications would be within the skill of the art. What is significant is that the novel device is a two terminal unit and permits regenerative action in a rectifying device. Thus, it is compatible with existing electrical circuitry and can be directly substituted for diodes that conduct for a limited time. Such substitution will maintain the desirable characteristics of the diode but will reduce the power loss by at least one order of magnitude.

What I claim is:
1. A rectifying device including a transistor having a base, collector and emitter,
   a transformer having a primary winding and a secondary winding thereon, such primary winding being in series with the emitter-collector current path through said transistor, and said secondary winding being connected to said base, said windings being wound whereby an increase in current through said emitter-collector path causes an increase in current in said base, to provide improved rectification.

2. A device including a transistor having a base, collector and emitter and a current gain of $\beta$,
   a transformer having a primary winding and a secondary winding,
   said primary winding being in series with the collector-emitter current path of said transistor and said secondary winding being in series with said base-collector current path and wound so as to provide a regenerative effect,
   the ratio of the number of turns of the secondary to the number of turns of the primary winding being less than the current gain $\beta$ of said transistor.

3. In a rectifier circuit wherein there is a rectifying element carrying current in the same direction during each half-cycle of the alternating current supply, the improvement consisting of a transistor as the rectifying element, said transistor having a base, a collector and emitter,
   a transformer-coupled pair of windings, one winding in series with the collector and the other winding in series with the base, said windings being regeneratively coupled so that an increase in emitter-collector current through the transistor results in a decrease in base-collector current, and vice versa.

4. In a full-wave rectifying circuit, a first transformer having an input winding and a secondary winding having a center tap and two ends, an output terminal connected to the center tap of said winding,
   a second transformer having two primary windings, each primary winding being connected in series with respective ends of said secondary winding,
   two transistors, each having a base, collector and emitter, and each transistor connected so that its collector is connected to its respective primary winding and the emitter of one transistor is connected to the emitter of the second transmitter,
   an output terminal connected to the connection of said emitters,
   a secondary winding on said transformer for each primary winding, said secondary winding connecting the base to the collector of its associated transistor,
   said primary and secondary windings being regeneratively coupled so that changes in emitter-to-collector current in one direction through its associated transistor produces corresponding changes in base current of such associated transistor.